United States Patent
Nakajima (10) Patent No.: US 12,319,087 B2
(45) Date of Patent: Jun. 3, 2025

(54) VEHICLE WHEEL ELEMENT STRUCTURE

(71) Applicant: SUBARU CORPORATION, Tokyo (JP)

(72) Inventor: Kojiro Nakajima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 525 days.

(21) Appl. No.: 17/692,300

(22) Filed: Mar. 11, 2022

(65) Prior Publication Data

US 2022/0305842 A1    Sep. 29, 2022

(30) Foreign Application Priority Data

Mar. 29, 2021 (JP) .................. 2021-055071

(51) Int. Cl.
  *B60B 3/00* (2006.01)
  *B60B 3/16* (2006.01)
  *F16B 37/14* (2006.01)

(52) U.S. Cl.
  CPC .............. *B60B 3/004* (2013.01); *B60B 3/008* (2013.01); *B60B 3/16* (2013.01); *F16B 37/14* (2013.01)

(58) Field of Classification Search
  CPC ........... B60B 3/16; B60B 3/165; B60B 3/004; B60B 3/008; B60B 3/10; B60B 3/12; F16B 37/14
  See application file for complete search history.

(56) References Cited

U.S. PATENT DOCUMENTS 5,971,496 A * 10/1999 Duning .................. B60B 3/165
  301/35.626
6,517,165 B1 * 2/2003 Handa .................... B60B 3/044
  301/35.632

(Continued)

FOREIGN PATENT DOCUMENTS

JP        1-156101 A    6/1989
JP    2008-256206 A   10/2008

(Continued)

OTHER PUBLICATIONS

Notice of Reasons for Refusal issued in Japanese Patent Application No. 2021-055071 dated Aug. 27, 2024, with machine translation.

*Primary Examiner* — Kip T Kotter
(74) *Attorney, Agent, or Firm* — TROUTMAN PEPPER LOCKE LLP (57) ABSTRACT

A vehicle wheel element structure includes a center disc member, abutment members, and wheel-element-side fastening surfaces. Disc members extend radially in an outer diameter direction from the center disc member. The center disc member includes a center bore and fastening holes. The abutment members are provided on an inner side of the center disc member. Each abutment member protrudes from a position that is away from an opening of a corresponding one of the fastening holes by a predetermined distance. Each abutment member protrudes by a predetermined amount with respect to a reference plane when the abutment member is fastened to a hub unit. The abutment members abut first on a hub-side fastening surface. The wheel-element-side fastening surfaces are provided on the inner side of the center disc member. Each wheel-element-side fastening surface includes the corresponding one of the openings.

4 Claims, 13 Drawing Sheets

(56) References Cited

U.S. PATENT DOCUMENTS

| | | | |
|---|---|---|---|
| 6,997,519 B2 * | 2/2006 | Fischbacher | B60B 3/008 |
| | | | 301/35.626 |
| 2008/0247817 A1 | 10/2008 | Geislinger et al. | |
| 2020/0198393 A1 * | 6/2020 | von Chappuis | B60B 27/0052 |

FOREIGN PATENT DOCUMENTS

| | | | | |
|---|---|---|---|---|
| JP | 2008230373 A * | 10/2008 | | |
| JP | 2014-508672 A | 4/2014 | | |
| JP | 2019-218039 A | 12/2019 | | |
| WO | WO-2007101574 A1 * | 9/2007 | | B60B 3/004 |
| WO | WO-2009138149 A1 * | 11/2009 | | B60B 3/008 |
| WO | 2012/110560 A1 | 8/2012 | | |

\* cited by examiner

VEHICLE WHEEL ELEMENT STRUCTURE

CROSS-REFERENCE TO RELATED APPLICATION

The present application claims priority from Japanese Patent Application No. 2021-055071 filed on Mar. 29, 2021, the entire contents of which are hereby incorporated by reference.

BACKGROUND

The disclosure relates to a vehicle wheel element structure to be fastened to a hub coupled to an axle.

Four tires, that is, front, rear, left, and right tires are provided on a vehicle, and wheel elements into which the respective tires are fitted are fastened to a hub coupled to an axle of either one of a drive shaft and a driven shaft. For example, Japanese Unexamined Patent Application Publication (JP-A) No. 2019-218039 discloses a technology for increasing rigidity of each vehicle wheel disc using a pressing member such as a circular arc member that protrudes toward the hub.

SUMMARY

An aspect of the disclosure provides a vehicle wheel element structure to be fastened to a hub unit of a vehicle. An inner side and an outer side of the vehicle wheel element structure are to be defined with respect to a vehicle width direction. The vehicle wheel element structure includes a center disc member, abutment members, and wheel-element-side fastening surfaces. Disc members extend radially in an outer diameter direction from the center disc member. The center disc member comprising a center bore and fastening holes. The abutment members are provided on an inner side of the center disc member. Each of the abutment members protrudes from a position that is away from an opening of a corresponding one of the fastening holes by a predetermined distance. The each of the abutment members protrudes by a predetermined amount with respect to a reference plane when the abutment member is fastened to the hub unit. The abutment members are configured to abut first on a hub-side fastening surface. The wheel-element-side fastening surfaces are provided on the inner side of the center disc member. Each of the wheel-element-side fastening surfaces includes a respective one of the openings. The each of the wheel-element-side fastening surfaces is configured to come into surface contact with the hub-side fastening surface on the reference plane when a fastened member that is inserted into the corresponding one of the fastening holes and a fastening member are fastened to each other at a predetermined fastening torque.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

A wheel element structure of a related art involves the following issues. A contact pressure concentrates on neighborhoods of a fastening hole of each bolt. This prevents each wheel element from being fastened to the hub by bringing entire fastening surfaces of the wheel element and the hub into uniform surface contact. Furthermore, as described in JP-A No. 2019-218039, a pressing member structure such as the circular arc member that protrudes toward the hub and the like are proposed. However, even with the configuration, a location where the pressing member locally and strongly presses the hub is generated in the pressing member.

Such an uneven contact pressure on the fastening surfaces of the wheel element and the hub results in a reduction in rigidity of a fastening member of the wheel element and in a reduction in a kinematic performance of the vehicle.

It is desirable to provide a vehicle wheel element structure that increases rigidity of a fastening member of a wheel fastened to a hub and that improves a kinematic performance of a vehicle.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
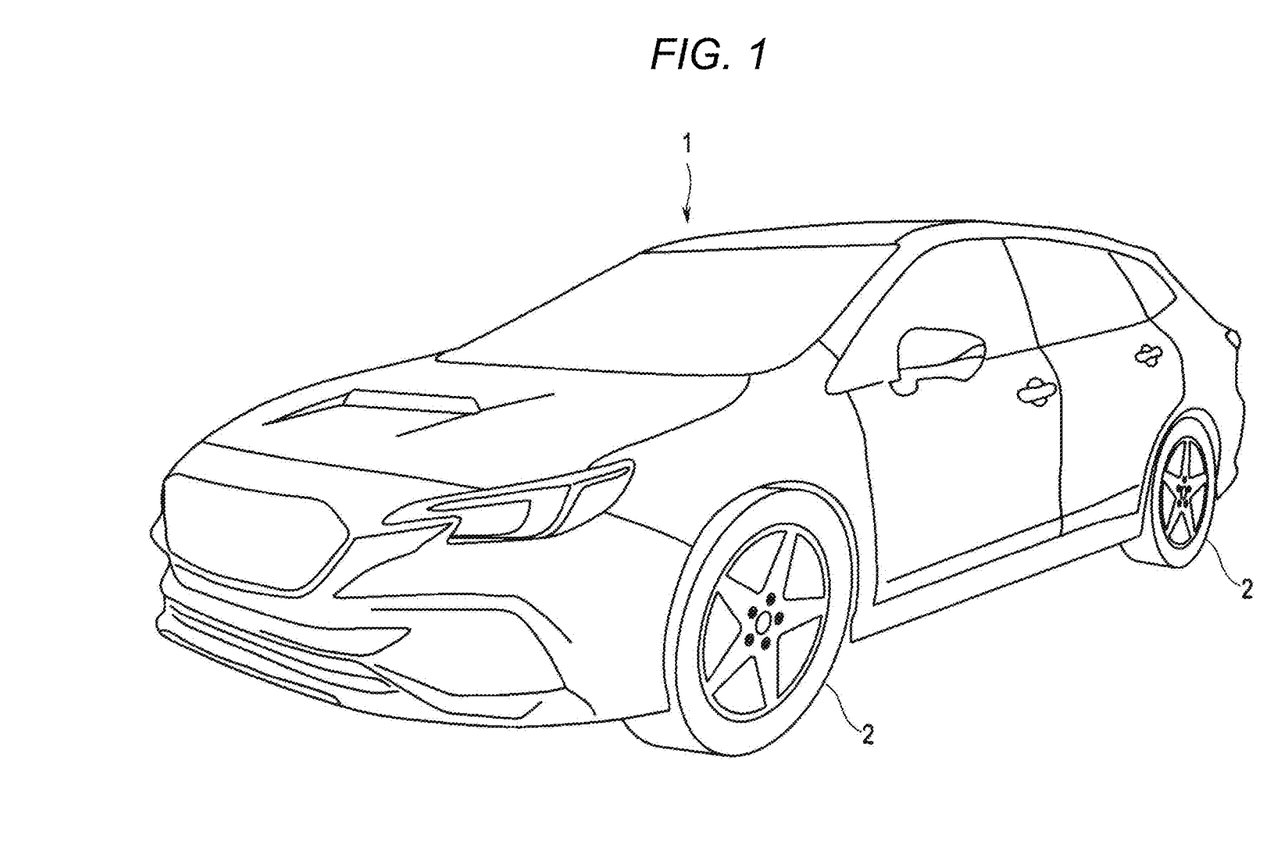
FIG. 1 is a perspective view illustrating a configuration of a vehicle according to an embodiment.
Figure 2:
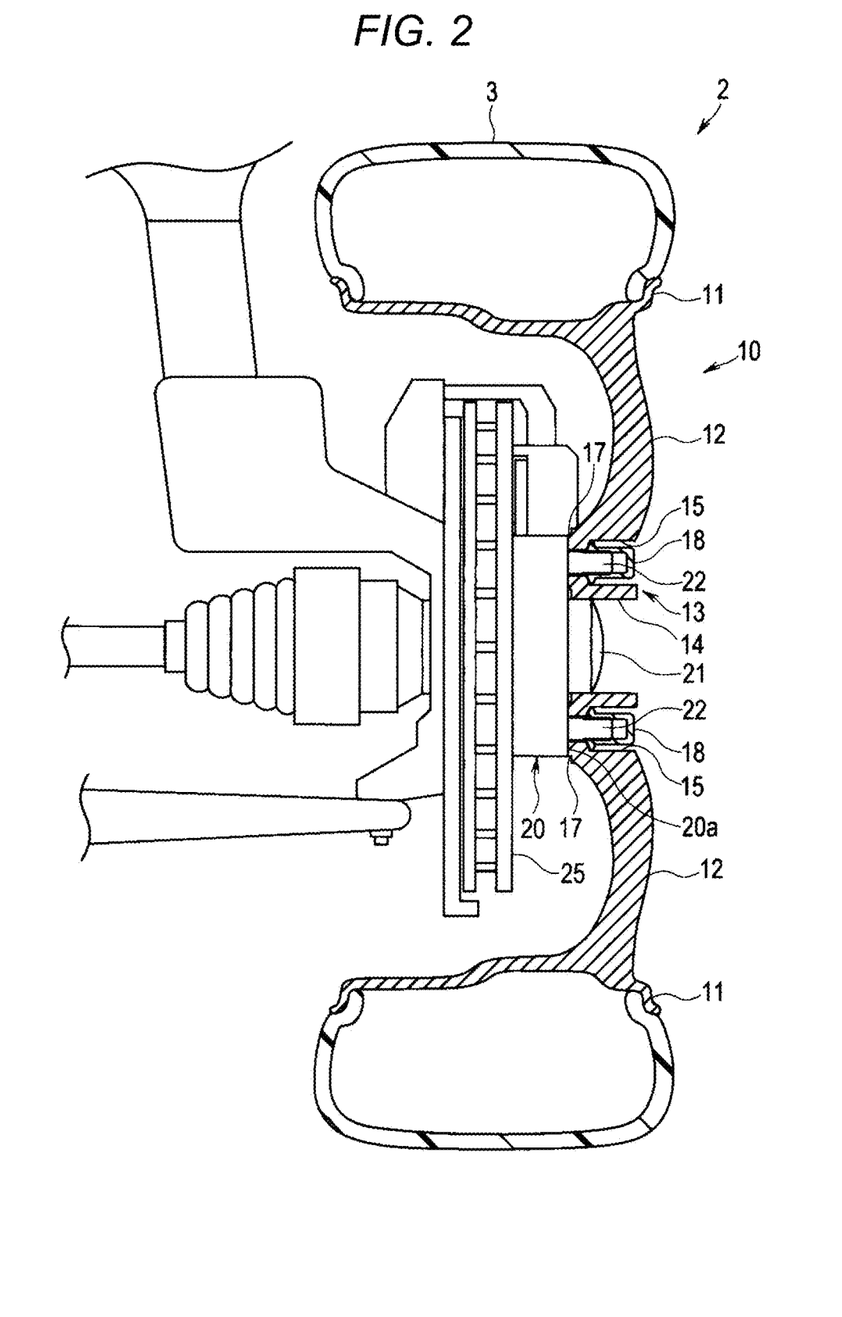
FIG. 2 is a partial cross-sectional view of a state in which wheels are mounted to a hub unit according to the embodiment.

As illustrated in FIG. 1, a plurality of wheels 2, that is, front, rear, left, and right wheels are provided on a vehicle 1. Since the vehicle 1 is a passenger vehicle in the disclosure, four wheels 2 are provided on the vehicle 1. As illustrated in FIG. 2, each wheel 2 is fastened to a hub unit 20 equipped with a brake rotor 25 coupled to an axle that is a rotating shaft of either one of a drive shaft and a driven shaft.

Figure 3:
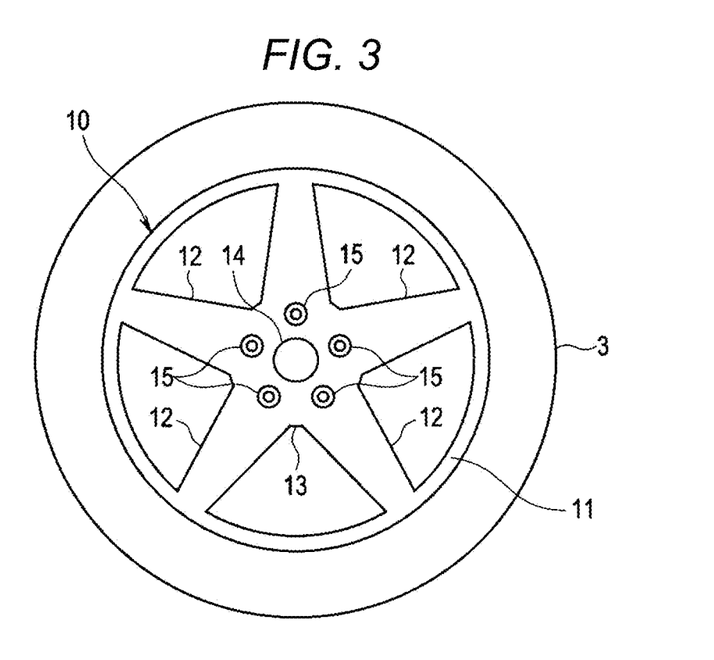
FIG. 3 is a plan view illustrating a configuration of an outer side of a wheel according to the embodiment.
Figure 4:
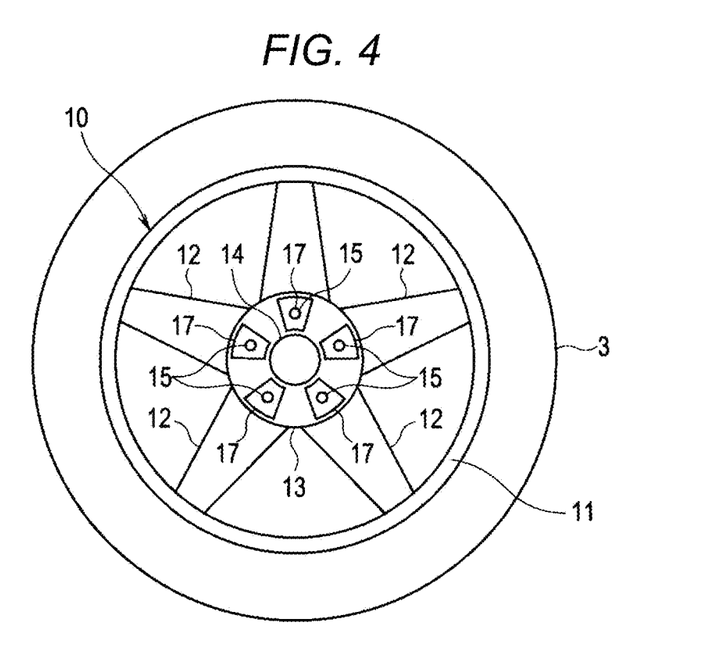
FIG. 4 is a plan view illustrating a configuration of an inner side of the wheel according to the embodiment.

As illustrated in FIGS. 2 to 4, one wheel 2 has a tire 3 and a metal vehicle wheel element 10 (hereinafter, which will be simply referred to as "wheel element 10"). The tire 3 is mainly made from rubber. This tire 3 is fitted into an outer circumference of the wheel element 10. In this embodiment, the wheel element 10 is a so-called aluminum wheel element formed from an aluminum alloy.

The wheel element 10 has a rim member 11, a plurality of disc members 12 (in the disclosure, five disc members 12), a center disc member 13, a center bore 14, a plurality of bolt holes 15 (in the disclosure, five bolt holes 15), and a plurality of fastening protrusions 17 (in the disclosure, five fastening protrusions 17) that are provided on an inner side of the center disc member 13 and that serve as protrusions. In one embodiment, the bolt holes 15 may serve as "fastening holes".

The disc members 12 are so-called spokes extending radially from the center disc member 13. The center bore 14 is a hole member with which a center hub 21 protruding from a center of the hub unit 20 is engaged.

Each of the five bolt holes 15 penetrates through the center disc member 13 and has an inward flange provided halfway along the bolt hole 15. A wheel nut 18, to be described later, abuts on the inward flange. A bolt screw 22 that is built on an outer surface 20a of the hub unit 20 is inserted into each of the five bolt holes 15. The wheel nut 18 is screwed into the bolt screw 22 at a predetermined torque. The wheel element 10 is thereby fastened to the hub unit 20. In one embodiment, the bolt screw 22 may serve as a "fastened member", and the wheel nut 18 may serves as a "fastening member".

Figure 5:
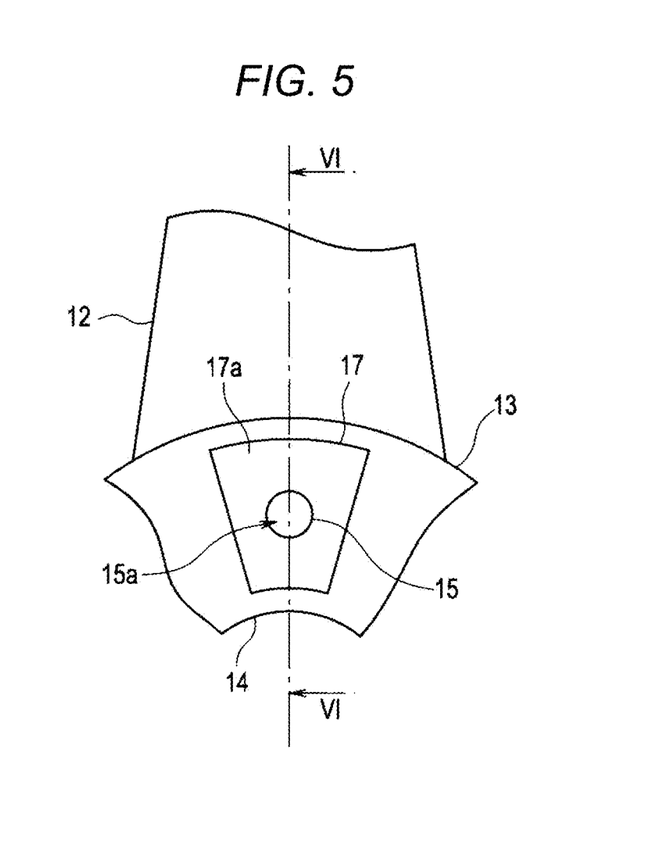
FIG. 5 illustrates a configuration of a fastening protrusion provided on an inner side of a center disc member of a vehicle wheel element according to the embodiment.

Each of the fastening protrusions 17 has an opening surface 15a that is an opening of the bolt hole 15. As illustrated in FIG. 5, an inner surface 17a protrudes in a fan-shaped fashion. The inner surface 17a is a front surface viewed from the inner side of the center disc member 13. In one embodiment, the inner surface 17a may serve as a "wheel-element-side fastening surface".

In a state in which the wheel element 10 is fastened to the hub unit 20, the inner surface 17a of each of the fastening protrusions 17 serves as a surface contact member that is opposed to and contacts the outer surface 20a that is a front surface of the hub unit 20. In one embodiment, the outer surface 20a may serve as a "hub-side fastening surface". It is noted that the outer surface 20a also serves as a front surface of the brake rotor 25 in the disclosure.

Figure 6:
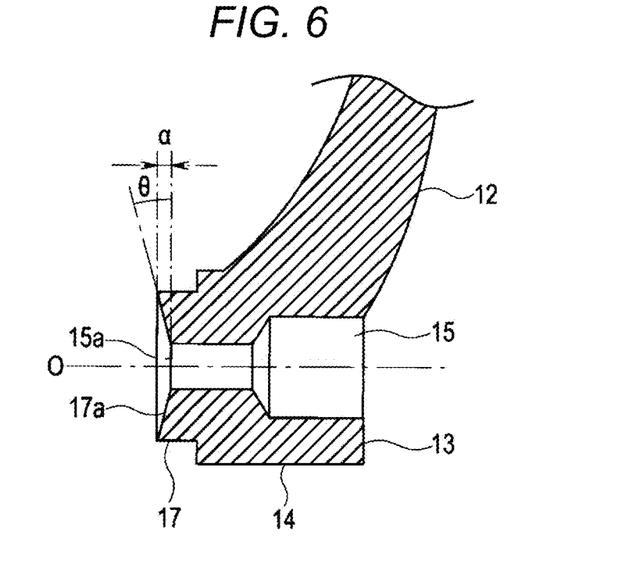
FIG. 6 is a cross-sectional view taken along a line VI-VI of FIG. 5 and illustrating the configuration of the fastening protrusion of the vehicle wheel element provided on the inner side of the center disc member according to the embodiment.

As illustrated in FIG. 6, an inner-side surface portion of each fastening protrusion 17 is worked by cutting or the like so that each inner surface 17a is formed into a mortar-shaped inclined surface at a predetermined angle θ at which the inclined surface is inclined toward a hole axis O of the bolt hole 15 and is set a depth of a predetermined amount α as minute as, for example, approximately 0.01 mm to 0.1 mm. That is, each inner surface 17a is a tapered surface an outer circumferential edge of which protrudes by the predetermined amount α and which is slightly thicker outward as being farther from the opening surface 15a of the bolt hole 15.

It is noted that a tapered surface that serves as a reference position of fastening surfaces of the fastening protrusion 17 and the hub unit 20 is set to the opening surface 15a of the bolt hole 15 in a state in which the wheel nut 18 is fastened to the bolt screw 22 at a predetermined fastening torque and in which the wheel element 10 is appropriately mounted to the hub unit 20. In one embodiment, the reference position may serve as a "reference plane".

Figure 7:
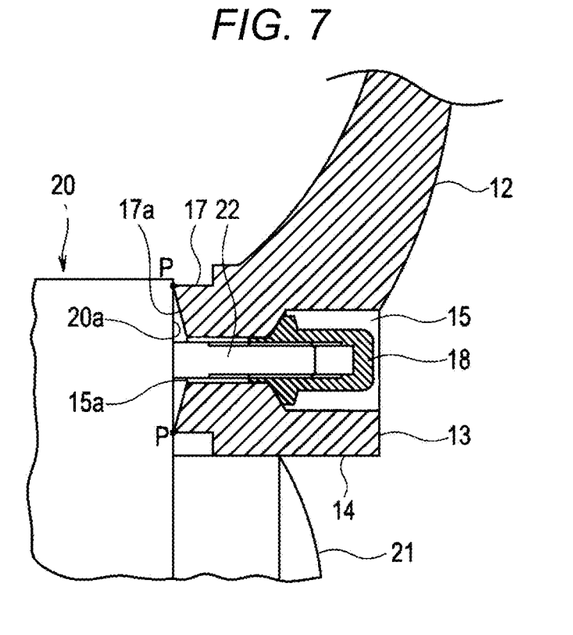
FIG. 7 is a partial cross-sectional view illustrating a state in which the vehicle wheel element is mounted to the hub unit according to the embodiment.

As illustrated in FIG. 7, when the wheel 2 is assembled with the hub unit 20, each edge P of an outer periphery of the inner surface 17a of each fastening protrusion 17 serves as an abutment member that abuts first on the outer surface 20a of the hub unit 20 in the wheel element 10 mounted to the vehicle 1 and configured as described above. The edge P protrudes to the inner side at a position apart from the bolt hole 15 by a predetermined distance.

Figure 8:
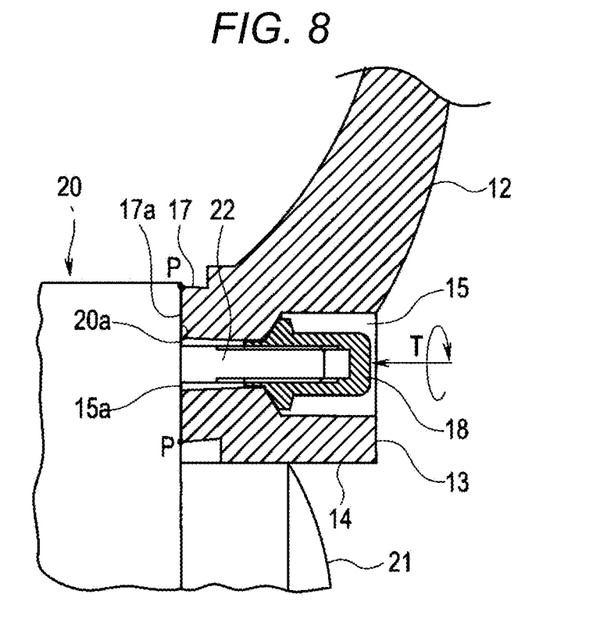
FIG. 8 is a partial cross-sectional view illustrating a state in which the vehicle wheel element is fastened to the hub unit according to the embodiment.

Furthermore, in the wheel element 10, the wheel nut 18 is fastened into the bolt screw 22 inserted into each bolt hole 15 at a predetermined fastening torque T. Subsequently, as illustrated in FIG. 8, each fastening protrusion 17 of the wheel element 10 is deformed to open outward. The inner surface 17a is gradually made parallel to the outer surface 20a, abuts on the outer surface 20a, and comes in surface contact with the outer surface 20a.

At this time, in each fastening protrusion 17, the reference position at which the inner surface 17a comes in surface contact with the outer surface 20a in a wide range serves as the opening surface 15a of the bolt hole 15.

The wheel element 10 can thereby prevent the inner surface 17a of each fastening protrusion 17 from locally abutting on the outer surface 20a, and cause the inner surface 17a to widely abut on the outer surface 20a to enlarge a contact area. That is, the fastening surface that is the inner surface 17a of the wheel element 10 and the fastening surface that is the outer surface 20a of the hub unit 20 can be uniformly and entirely fastened to each other without concentration of a contact pressure on surroundings of the bolt hole 15 that serves as the fastening hole into which each bolt screw 22 is inserted.

Owing to this, it is possible to prevent an uneven contact pressure on the fastening surfaces of the wheel element 10 and the hub unit 20, and increase rigidity of a portion where the wheel element 10 and the hub unit 20 are fastened to each other. It is also possible to improve a kinematic performance of the vehicle 1.

With the configuration of each wheel element 10 mounted to the vehicle 1 according to the present embodiment described above, it is possible to increase the rigidity with which the wheel element 10 is fastened to the hub unit 20 and improve the kinematic performance of the vehicle 1.

Next, a configuration of each wheel element 10 mounted to a vehicle 1 according to a second embodiment will be described. It is noted that the same elements as those according to the first embodiment are denoted by the same reference signs and descriptions of the elements are omitted.

Figure 9:
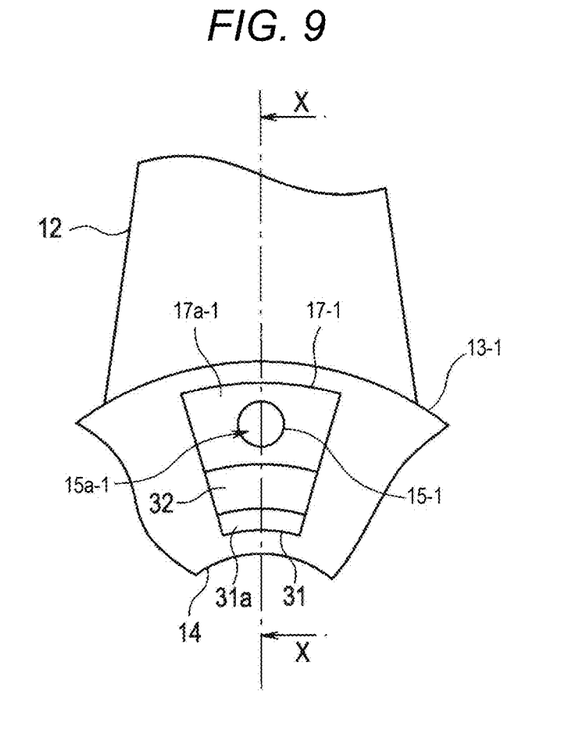
FIG. 9 illustrates a configuration of a fastening protrusion of a vehicle wheel element provided on an inner side of a center disc member according to an embodiment.
Figure 10:
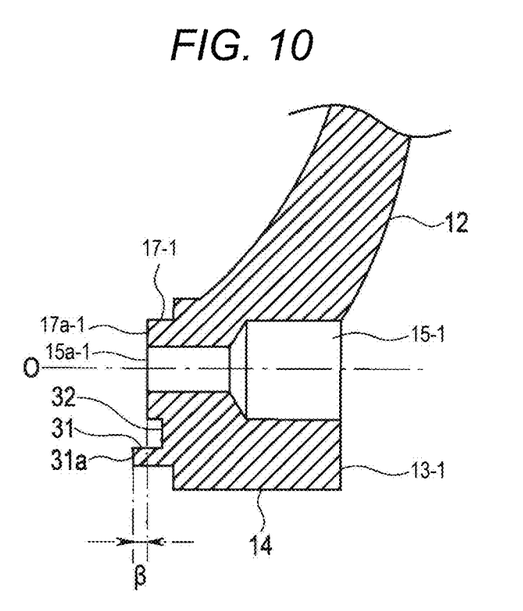
FIG. 10 is a cross-sectional view taken along a line X-X of FIG. 9 and illustrating the configuration of the fastening protrusion of a vehicle wheel element provided on the inner side of the center disc member according to the embodiment.

As illustrated in FIGS. 9 and 10, each fastening protrusion 17-1 according to the present embodiment includes a circular arc protrusion 31 and a recessed groove 32. The protrusion 31 is closer to the center bore 14 than the bolt hole 15-1. In other words, the protrusion 31 is disposed in an inner diameter direction of a wheel element 10 with respect to the bolt hole 15-1. The protrusion 31 protrudes to an inner side from a position that is apart from the bolt hole 15-1 by a predetermined distance. The groove 32 is disposed outward of and adjacent to the protrusion 31.

This protrusion 31 has an abutment surface 31a on an inner-side protrusion end. It is noted that each fastening protrusion 17-1 has an inner surface 17a-1 outward of the groove 32, and an opening surface 15a-1 of each bolt hole 15-1 is formed in this inner surface 17a-1.

Furthermore, each fastening protrusion 17-1 is worked by cutting or the like so that the protrusion 31 protrudes from the inner surface 17a-1 and the opening surface 15a-1 of the bolt hole 15-1 to the inner side by a predetermined amount β as minute as, for example, approximately 0.01 mm to 0.1 mm. That is, the protrusion 31 of each fastening protrusion 17-1 serves as an abutment member that is in a plane identical to a plane in which the inner surface 17a-1 and the opening surface 15a-1 of the bolt hole 15-1 are present and that is thicker by the predetermined amount β from the inner surface 17a-1 and the bolt hole 15-1 to the inner side.

The inner surface 17a-1 and the opening surface 15a-1 of the bolt hole 15-1 are set herein at a reference position in a state in which a wheel nut 18 is fastened to a bolt screw 22 at a predetermined fastening torque T and in which the wheel element 10 is appropriately mounted to a hub unit 20. That is, the inner surface 17a-1 and the opening surface 15a-1 of the bolt hole 15-1 are provided in the same plane. It is noted that the inner surface 17a-1 may be a tapered surface similarly to the first embodiment.

Figure 11:
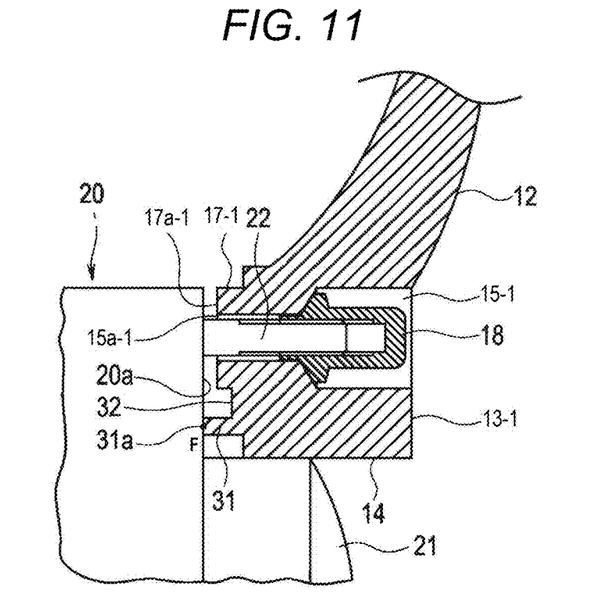
FIG. 11 is a partial cross-sectional view illustrating a state in which the vehicle wheel element is mounted to a hub unit according to the embodiment.

As illustrated in FIG. 11, when the wheel 2 is assembled with the hub unit 20, the abutment surface 31a of the protrusion 31 serves as an abutment member that abuts first on an outer surface 20a of the hub unit 20 in each wheel element 10 mounted to the vehicle 1 according to the present embodiment, which is configured as described above. The abutment surface 31a protrudes from a position apart from the bolt hole 15-1 of each fastening protrusion 17-1 in the inner diameter direction of the wheel element 10 by a predetermined distance. The abutment surface 31a is closer to the center bore 14 than the bolt hole 15-1 of each fastening protrusion 17-1.

Figure 12:
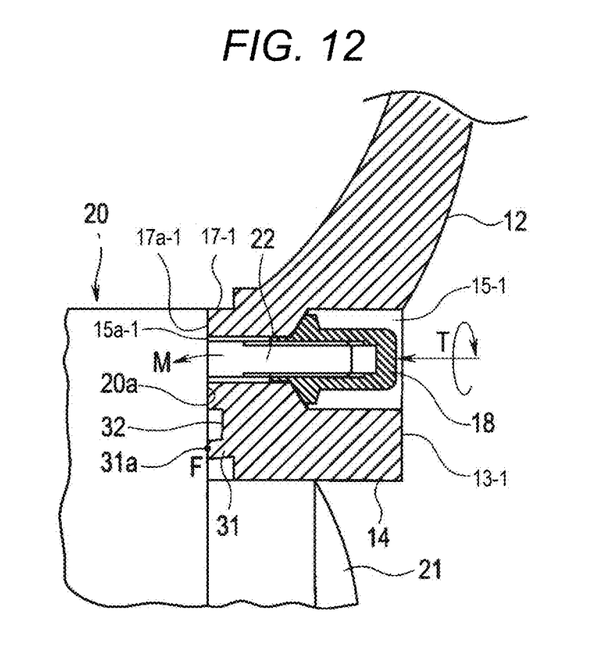
FIG. 12 is a partial cross-sectional view illustrating a state in which the vehicle wheel element is fastened to the hub unit according to the embodiment.

Subsequently, as illustrated in FIG. 12, when the wheel nut 18 is fastened to the bolt screw 22 inserted into each bolt hole 15-1 at a predetermined fastening torque T, moment M to the hub unit 20 is generated with the abutment surface 31a of the protrusion 31 of each fastening protrusion 17-1 used as a fulcrum F in the wheel element 10. The inner surface 17a-1 then abuts on the outer surface 20a and comes in surface contact with the outer surface 20a.

At this time, both the protrusion 31 of each fastening protrusion 17-1 present inward in the wheel element 10 and the inner surface 17a-1 thereof present outward in the wheel element 10 come in surface contact with the outer surface 20a at the reference position.

The wheel element 10 according to the present embodiment can thereby prevent the inner surface 17a-1 of each fastening protrusion 17-1 from locally abutting on the outer surface 20a.

That is, according to the present embodiment, a fastening surface that is the inner surface 17a-1 of the wheel element 10 and a fastening surface that is the outer surface 20a of the hub unit 20 can be similarly entirely brought into surface contact with each other and uniformly fastened to each other without concentration of a contact pressure on the surroundings of the bolt hole 15-1 that serves as a fastening hole into which each bolt screw 22 is inserted.

Moreover, the moment M to the hub unit 20 is generated with the abutment surface 31a of the protrusion 31 that is provided in each fastening protrusion 17-1 used as the fulcrum F in a state in which the wheel nut 18 is fastened to the bolt screw 22 at the predetermined fastening torque T and in which the wheel element 10 is appropriately mounted to the hub unit 20.

Owing to this, it is possible to ensure an arm length from the fulcrum F of the protrusion 31 generating the moment M to a fastening position. It is, therefore, possible to further increase rigidity of a portion where the wheel element 10 and the hub unit 20 are fastened to each other. The moment M is generated against pry input that occurs by fastening the wheel nut 18 to the bolt screw 22.

With the configuration of the wheel element 10 according to the present embodiment described above, similarly to the first embodiment, it is possible to increase the rigidity with which the wheel element 10 is fastened to the hub unit 20 and improve a kinematic performance of the vehicle 1.

Next, a configuration of each wheel element 10 mounted to a vehicle 1 according to a third embodiment will be described. It is noted that the same elements those according to the first and second embodiments are denoted by the same reference signs and descriptions of the elements are omitted.

Figure 13:
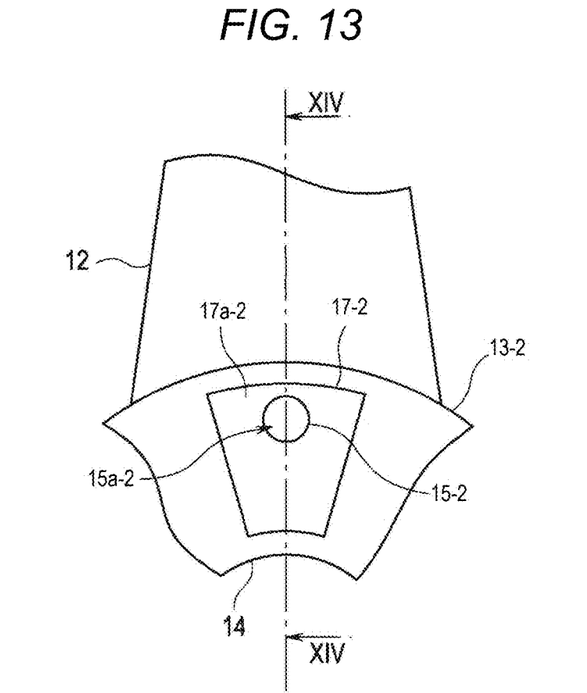
FIG. 13 illustrates a configuration of a fastening protrusion of a vehicle wheel element provided on an inner side of a center disc member according to an embodiment.
Figure 14:
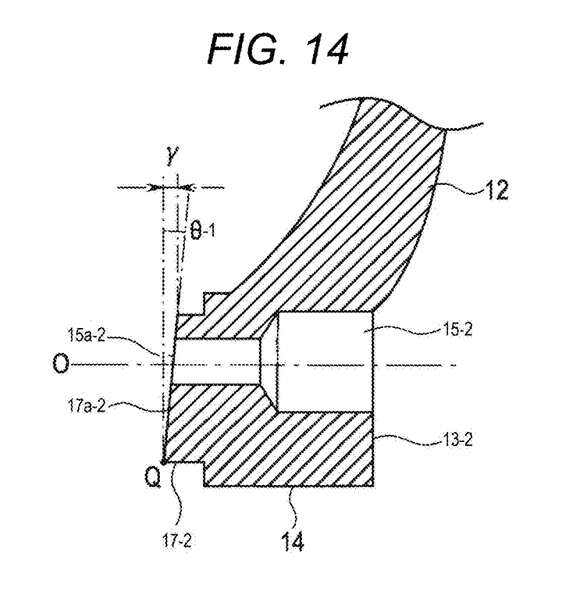
FIG. 14 is a cross-sectional view taken along a line XIV-XIV of FIG. 13 and illustrating the configuration of the fastening protrusion of a vehicle wheel element provided on the inner side of the center disc member according to the embodiment.

As illustrated in FIGS. 13 and 14, an inner surface 17a-2 of each fastening protrusion 17-2 according to the present embodiment is an inclined surface at a predetermined angle θ-1 at which the inclined surface is inclined toward an inner diameter direction of a wheel element 10 (that is, toward a center bore 14). An edge Q at a position apart from a bolt hole 15-2 in the inner diameter direction of the wheel element 10 by a predetermined distance (that is, the edge Q is closer to the center bore 14 than the bolt hole 15-2) protrudes to an inner side by a predetermined amount Y as minute as, for example, approximately 0.01 mm to 0.1 mm.

It is noted that the inner surface 17a-2 of the fastening protrusion 17-2 is the inclined surface by working part of the inner-side surface by cutting or the like. That is, each inner surface 17a-2 is a tapered surface slightly thicker outward to inward of a center disc member 13-2 of the wheel element 10.

Furthermore, the bolt hole 15-2 in each fastening protrusion 17-2 is provided outward of the wheel element 10, and an opening surface 15a-2 is also located outward of the wheel element 10 on the inner surface 17a-2.

Figure 15:
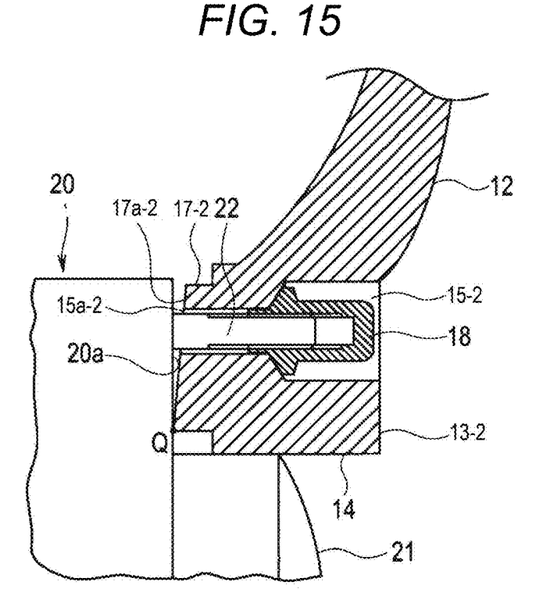
FIG. 15 is a partial cross-sectional view illustrating a state in which the vehicle wheel element is mounted to a hub unit according to the embodiment.

As illustrated in FIG. 15, when a wheel 2 is assembled with a hub unit 20, the edge Q of each fastening protrusion 17-2 serves as an abutment member that abuts first on an outer surface 20a of the hub unit 20 in each wheel element 10 mounted to a vehicle 1 according to the present embodiment, which is configured as described above. The edge Q protrudes from the position apart from the bolt hole 15-2 in the inner diameter direction of the wheel element 10 by the predetermined distance. The edge Q is closer to the center bore 14 than the bolt hole 15-2.

Figure 16:
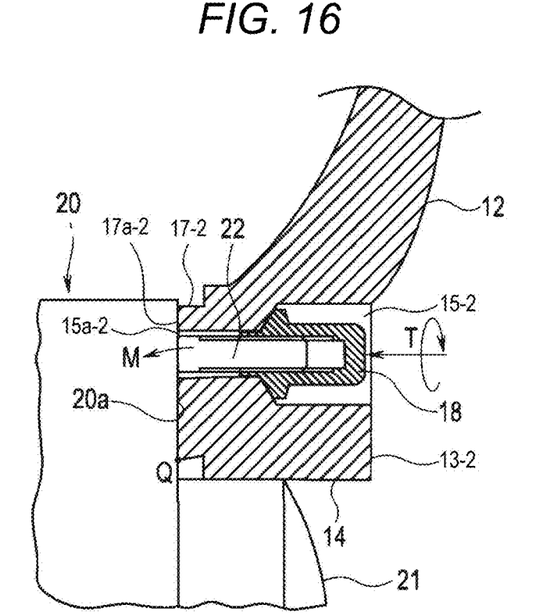
FIG. 16 is a partial cross-sectional view illustrating a state in which the vehicle wheel element is fastened to the hub unit according to the embodiment.

Subsequently, as illustrated in FIG. 16, when a wheel nut 18 is fastened to a bolt screw 22 inserted into each bolt hole 15-2 at a predetermined fastening torque T, moment M is generated with the edge Q of each fastening protrusion 17-2 used as a fulcrum in the wheel element 10. The inner surface 17a-2 then abuts on the outer surface 20a and comes in surface contact with the outer surface 20a.

At this time, the inner surface 17a-2 of each fastening protrusion 17-2 comes in surface contact with the outer surface 20a and the opening surface 15a-2 of the bolt hole 15-2 at a reference position.

The wheel element 10 according to the present embodiment can thereby similarly prevent the inner surface 17a-2 of each fastening protrusion 17-2 from locally abutting on the outer surface 20a.

Moreover, similarly to the second embodiment, the moment M is generated with the edge Q of each fastening protrusion 17-2 used as the fulcrum in a state in which the wheel nut 18 is fastened to the bolt screw 22 at the predetermined fastening torque T and in which the wheel element 10 is appropriately mounted to the hub unit 20.

Owing to this, it is possible to ensure an arm length from the fulcrum of the edge Q of each fastening protrusion 17-2 generating the moment M to a fastening position. It is, therefore, possible to further increase rigidity of a portion where the wheel element 10 and the hub unit 20 are fastened to each other. The moment M is generated against pry input that occurs by fastening the wheel nut 18 to the bolt screw 22. Furthermore, it is possible to make a contact area of the inner surface 17a-2 of each fastening protrusion 17-2 with the outer surface 20a according to the present embodiment larger than a contact area according to the second embodiment.

With the configuration of the wheel element 10 according to the present embodiment described above, similarly to the first and second embodiments, it is possible to increase the rigidity with which the wheel element 10 is fastened to the hub unit 20 and improve a kinematic performance of the vehicle 1.

Next, a configuration of each wheel element 10 mounted to a vehicle 1 according to a fourth embodiment will be described. It is noted that the same elements those according to the first to third embodiments are denoted by the same reference signs and descriptions of the elements are omitted.

Figure 17:
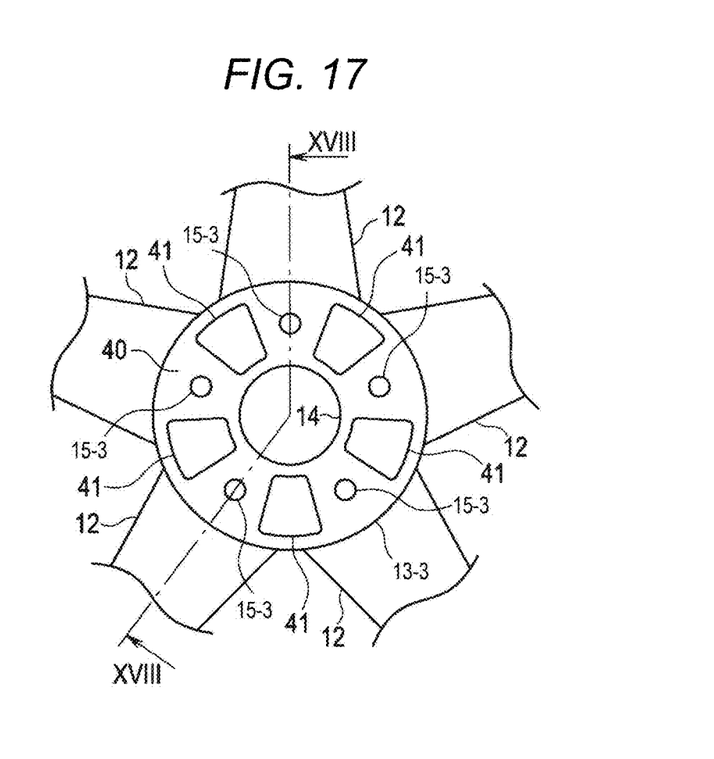
FIG. 17 is a plan view illustrating a configuration of an inner side of a center disc member according to an embodiment.

As illustrated in FIG. 17, a center disc member 13-3 of a wheel element 10 according to the present embodiment has an inner surface 40. In one embodiment, the inner surface 40 may serve as a "wheel-element-side fastening surface". A plurality of recesses 41 (in the disclosure, five recesses 41) are formed in the inner surface 40 between openings 15a-3 of bolt holes 15-3 in a circumferential direction.

Figure 18:
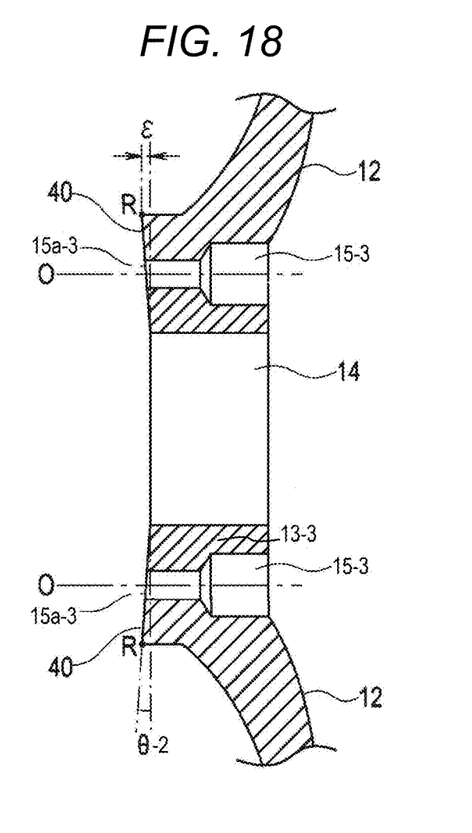
FIG. 18 is a cross-sectional view taken along a line XVIII-XVIII of FIG. 17 and illustrating the configuration of the center disc member of a vehicle wheel element according to the embodiment.

As illustrated in FIG. 18, the inner surface 40 is an inclined surface at a predetermined angle θ-2 at which the inclined surface is inclined toward an outside of a center bore 14. An edge R at a position apart from the bolt hole 15-3 in an outer diameter direction of the wheel element 10 by a predetermined distance (that is, the edge R is farther from the center bore 14 than the bolt hole 15-3) protrudes to an inner side by a predetermined amount E of, for example, approximately 0.06 mm.

That is, each inner surface 40 is a tapered surface that protrudes by a predetermined quantity ε and that is slightly thicker outward as being farther from the center bore 14.

Figure 19:
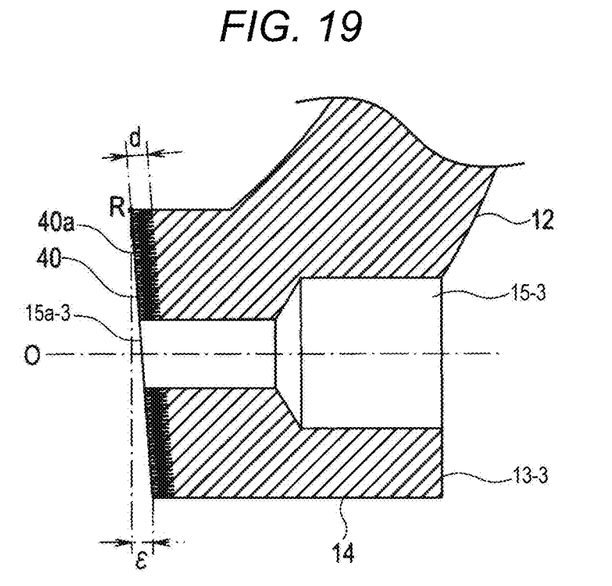
FIG. 19 is a partial cross-sectional view illustrating the configuration of the center disc member of the vehicle wheel element according to the embodiment.

Furthermore, as illustrated in FIG. 19, a rough surface 40a is formed entirely on each inner surface 40. The rough surface 40a is a portion in which fine irregularities are easy to compress. The rough surface 40a has a depth d of, for example, approximately 0.06 mm. The depth of the rough surface 40a is identical to a protrusion amount of an edge R of the inner surface 40.

Figure 20:
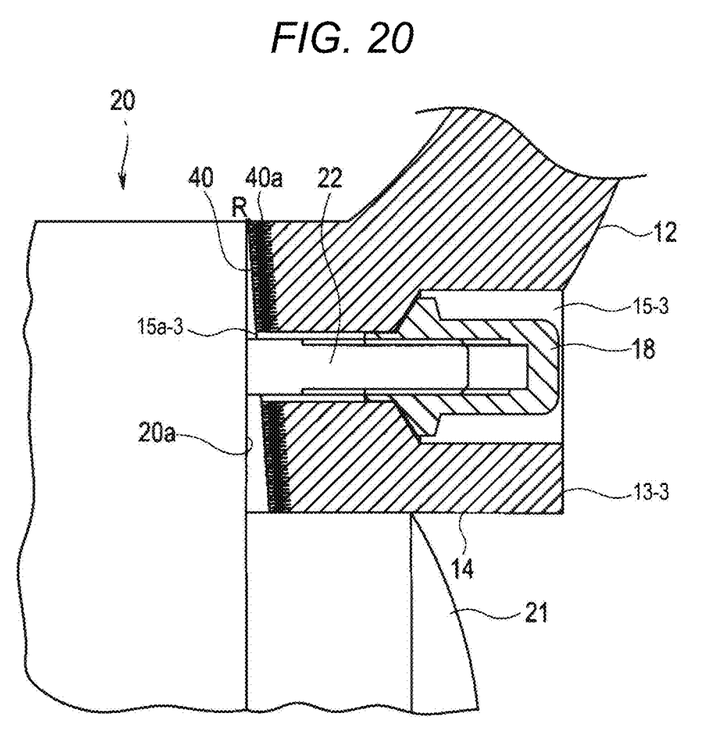
FIG. 20 is a partial cross-sectional view illustrating a state in which the vehicle wheel element is mounted to a hub unit according to the embodiment.

As illustrated in FIG. 20, when a wheel 2 is assembled with a hub unit 20, the edge R of the inner surface 40 serves as an abutment member that abuts first on an outer surface 20a of the hub unit 20 in each wheel element 10 mounted to a vehicle 1 according to the present embodiment, which is configured as described above. The edge R protrudes from the position apart from the bolt hole 15-3 in the outer diameter direction of the wheel element 10 by the predetermined distance. The edge R is farther from the center bore 14 than the bolt hole 15-3.

Figure 21:
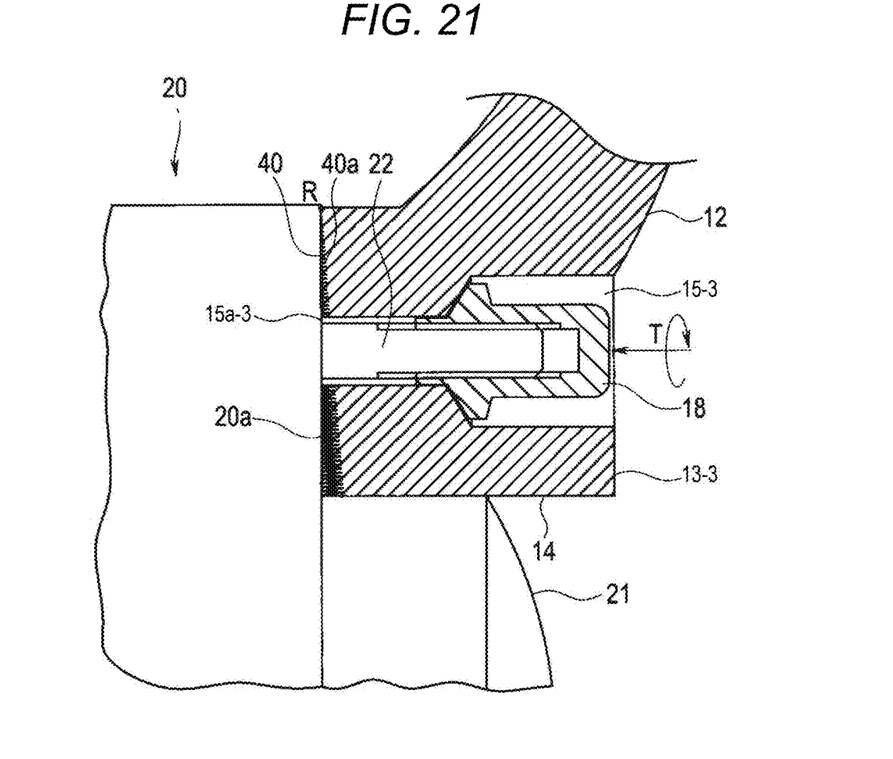
FIG. 21 is a partial cross-sectional view illustrating a state in which the vehicle wheel element is fastened to the hub unit according to the embodiment.

Subsequently, as illustrated in FIG. 21, when a wheel nut 18 is fastened to a bolt screw 22 inserted into each bolt hole 15-3 at a predetermined fastening torque T, the rough surface 40a on the inner surface 40 are compressed in the wheel element 10. The inner surface 40 then abuts on the outer surface 20a and comes in surface contact with the outer surface 20a.

At this time, the inner surface 40 comes in surface contact with the outer surface 20a at a reference position. Furthermore, the rough surface 40a are easy to compress to the reference position at which the inner surface 40 comes in surface contact with the outer surface 20a. This is because the depth d of the rough surface 40a is identical to the protrusion amount of the edge R of the inner surface 40.

The wheel element 10 according to the present embodiment can thereby similarly prevent the inner surface 17a-3 of each fastening protrusion 17-3 from locally abutting on the outer surface 20a.

Figure 22:
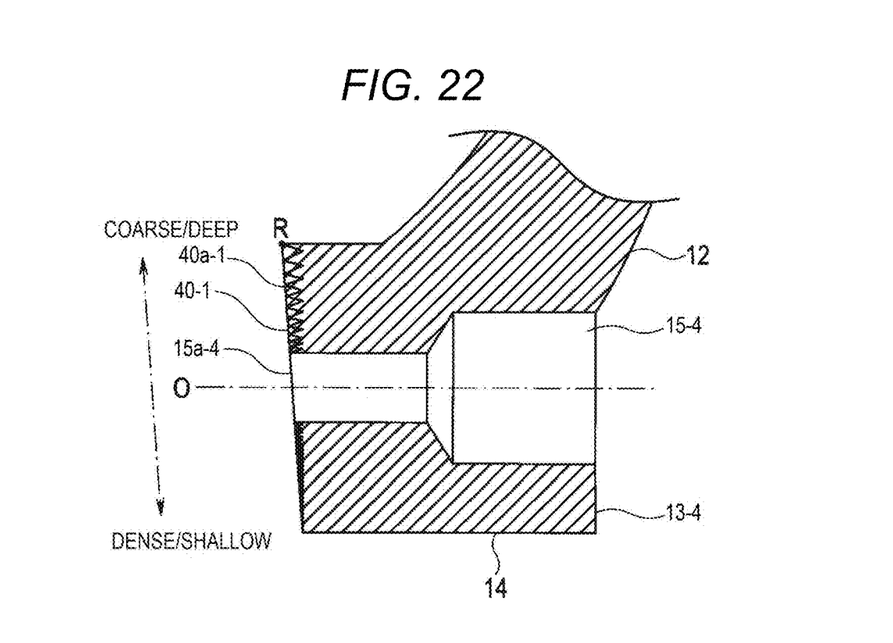
FIG. 22 is a partial cross-sectional view illustrating a configuration of a center disc member of a vehicle wheel element according to a modification.

As illustrated in FIG. 22, the rough surface 40a-1 on the inner surface 40-1 may be easily compressed from an edge R-side that abuts first on the outer surface 20a by forming the irregularities coarsely to densely from the protruding edge R to the center bore 14.

Furthermore, the rough surface 40a-1 may be shallower from the protruding edge R to the center bore 14 in proportion to the reference position at which the inner surface 40-1 comes in surface contact with the outer surface 20a.

In this way, the wheel element 10 can facilitate compressing the irregularities from the edge R-side that abuts first on the outer surface 20a, and facilitate bringing the entire inner surface 40-1 into surface contact with the outer surface 20a by forming the rough surface 40a-1 on the inner surface 40-1.

With the configuration of the wheel element 10 according to the present embodiment described above, similarly to the first to third embodiments, it is possible to increase rigidity with which the wheel element 10 is fastened to the hub unit 20 and improve a kinematic performance of the vehicle 1.

The disclosure is not limited to the embodiments described so far. Furthermore, various modifications could be carried out without departure from the concept of the disclosure when the disclosure is carried out. Moreover, each embodiment encompasses the disclosure in various stages; thus, various aspects of the disclosure could be extracted by appropriately combining a plurality of disclosed elements.

For example, let it be assumed that several elements are removed from all elements described in the embodiments. When the problems mentioned can be solved and the advantageous effects mentioned can be obtained, the configuration from which the elements are removed could be extracted as an aspect of the disclosure.

The invention claimed is:

1. A vehicle wheel element structure to be fastened to a hub unit of a vehicle, an inner side and an outer side of the vehicle wheel element structure being defined with respect to a vehicle width direction, the vehicle wheel element structure comprising:
   a center disc member from which disc members extend radially in an outer diameter direction, the center disc member comprising a center bore and fastening holes;
   abutment members that are provided on an inner side of the center disc member, each of the abutment members protruding from a position that is away from an opening of a corresponding one of the fastening holes by a predetermined distance, the each of the abutment members protruding by a predetermined amount with respect to a reference plane when the abutment member is fastened to the hub unit, the abutment members being configured to abut first on a hub-side fastening surface; and
   wheel-element-side fastening surfaces that are provided on the inner side of the center disc member, each of the wheel-element-side fastening surfaces comprising the openings, the each of the wheel-element-side fastening surfaces being configured to come into surface contact with the hub-side fastening surface on the reference plane when a fastened member that is inserted into the corresponding one of the fastening holes and a fastening member are fastened to each other at a predetermined fastening torque, wherein
   the each of the wheel-element-side fastening surfaces is a tapered surface comprising a rough surface having a predetermined depth, the tapered surface having a predetermined angle,
   the depth is identical to a protrusion amount of a respective one of the abutment members from the reference plane, and
   the each of the abutment members is an edge of a corresponding one of the wheel-element-side fastening surfaces.

2. The vehicle wheel element structure according to claim 1, further comprising:
   fastening protrusions each of which comprises a corresponding one of the wheel-element-side fastening surfaces and a corresponding one of the abutment members on the inner side of the center disc member, wherein
   the each of the abutment members is an edge of the corresponding one of the wheel-element-side fastening surfaces.

3. A vehicle wheel element structure to be fastened to a hub unit of a vehicle, an inner side and an outer side of the vehicle wheel element structure being defined with respect to a vehicle width direction, the vehicle wheel element structure comprising:
   a center disc member from which disc members extend radially in an outer diameter direction, the center disc member comprising a center bore and fastening holes;
   abutment members that are provided on an inner side of the center disc member, each of the abutment members protruding from a position that is away from an opening of a corresponding one of the fastening holes by a predetermined distance, the each of the abutment members protruding by a predetermined amount with respect to a reference plane when the abutment member is fastened to the hub unit, the abutment members being configured to abut first on a hub-side fastening surface; and
   wheel-element-side fastening surfaces that are provided on the inner side of the center disc member, each of the wheel-element-side fastening surfaces comprising the openings, the each of the wheel-element-side fastening surfaces being configured to come into surface contact with the hub-side fastening surface on the reference plane when a fastened member that is inserted into the corresponding one of the fastening holes and a fastening member are fastened to each other at a predetermined fastening torque;
   the each of the wheel-element-side fastening surfaces is a tapered surface comprising a rough surface having a predetermined depth, the tapered surface having a predetermined angle,
   the depth becomes smaller from a corresponding one of the abutment members to the center disc member so that the rough surface changes from a coarse rough surface to a dense rough surface, and
   the each of the abutment members is an edge of a corresponding one of the wheel-element-side fastening surfaces.

4. The vehicle wheel element structure according to claim 3, further comprising:
   fastening protrusions each of which comprises a corresponding one of the wheel-element-side fastening surfaces and a corresponding one of the abutment members on the inner side of the center disc member, wherein
   the each of the abutment members is an edge of the corresponding one of the wheel-element-side fastening surfaces.

* * * * *